United States Patent [19]

Pierson

[11] 4,446,023

[45] May 1, 1984

[54] VACUUM BELT FILTER

[76] Inventor: Henri G. W. Pierson, London Rd., Bozeat, Wellingborough, Northamptonshire, NN9 7JR, England

[21] Appl. No.: 407,047

[22] Filed: Aug. 11, 1982

[51] Int. Cl.³ ............................................ B01D 33/04
[52] U.S. Cl. ..................................... 210/400; 210/783
[58] Field of Search ............... 210/386, 783, 400, 401, 210/406

[56] References Cited

U.S. PATENT DOCUMENTS 3,038,789  6/1962  Bennett et al. ....................... 210/386
3,307,704  3/1967  Pashiaian et al. .................... 210/400

Primary Examiner—Frank Sever

Attorney, Agent, or Firm—Ross, Ross & Flavin

[57] ABSTRACT

In order to progress belt 10 in stepwise manner without the need for a heavy tensioning roller towards the end of return run 19, ram 58 is displaced to the left thereby moving first stepping roll 55 to its dotted line position and extending bight 59 to draw the forward end of upper run 13 into said bight 59. Movement in the opposite direction of belt 10 is prevented by a unidirectional devices, e.g. pawl and ratchet mechanisms (not shown), on rollers 53, 54. Simultaneously, second stepping roll 56 is moved to its dotted line position to correspondingly reduce the extent of bight 60, thereby permitting part of return run 19 of belt 10 to move back into upper run 13. Subsequently, ram 58 is displaced to the right return rolls 55 and 56 to their initial positions, reduce bight 59 and extend bight 60.

7 Claims, 6 Drawing Figures

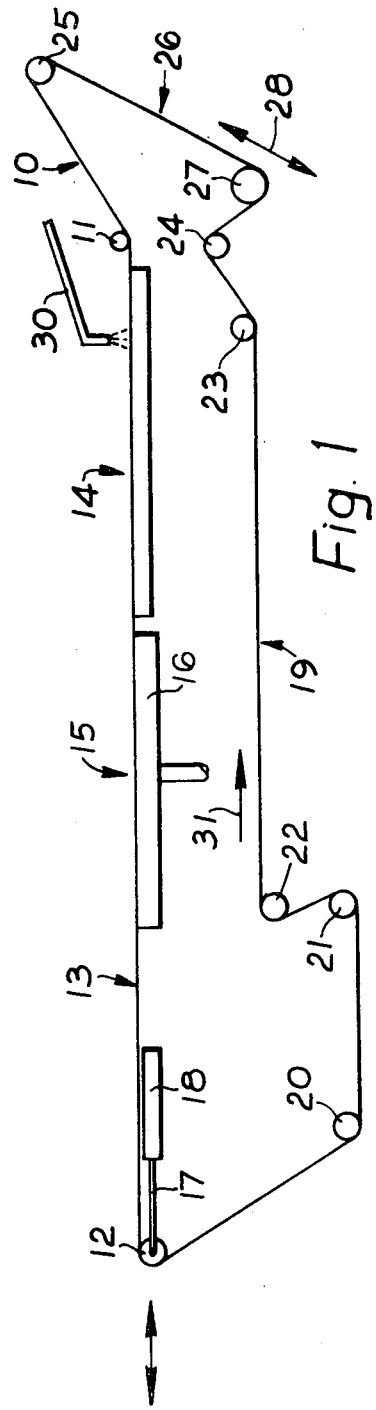
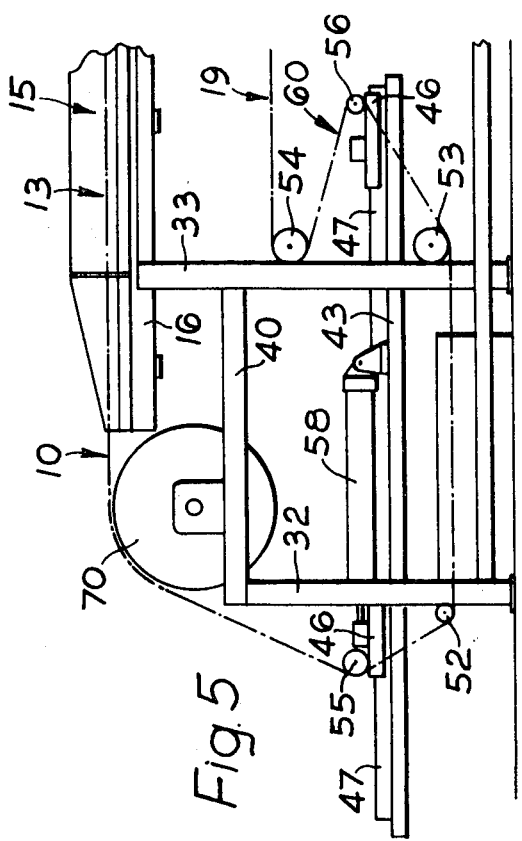
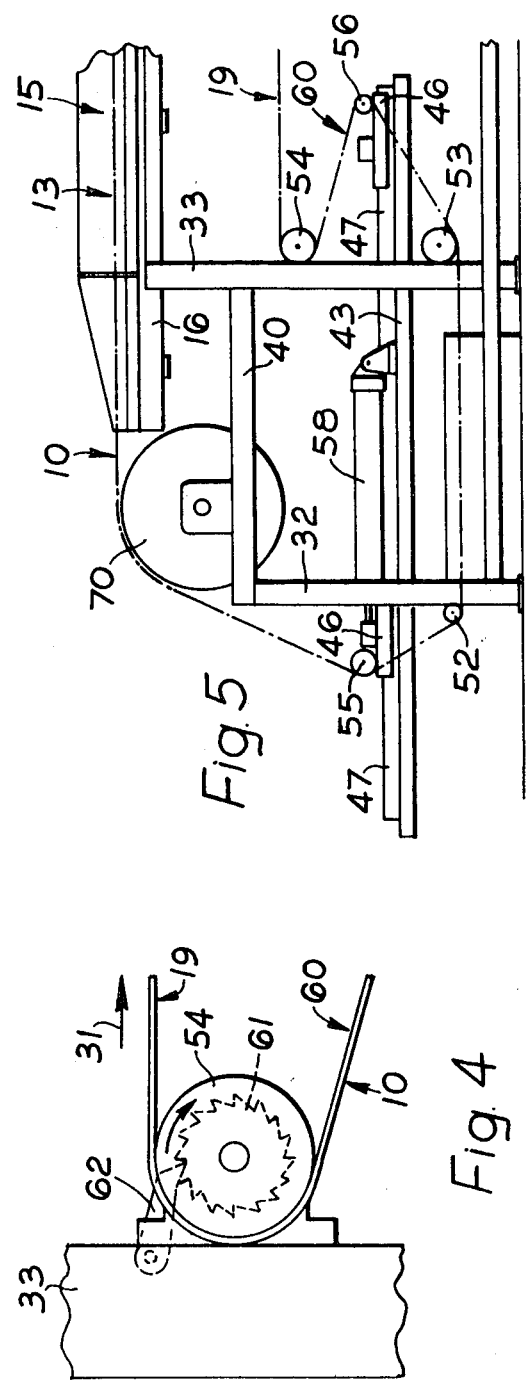

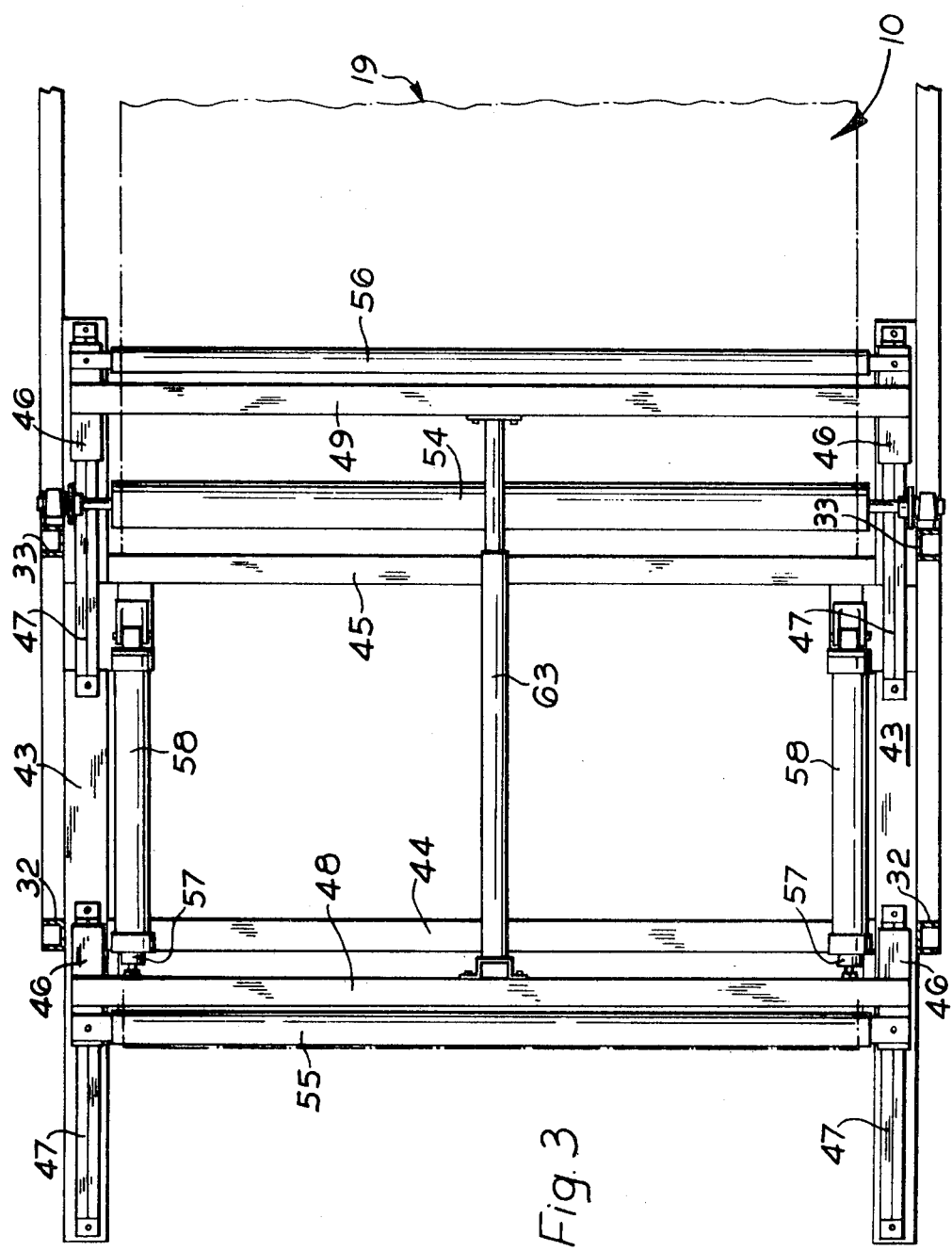

VACUUM BELT FILTER

FIELD OF INVENTION

This invention concerns vacuum belt filters of the kind comprising an endless filter belt or cloth adapted to be progressed so that an upper run thereof moves stepwise over one or more vacuum boxes whereby a slurry supplied to said upper run is dewatered to cause a filter cake to be deposited on the said upper run.

BACKGROUND ART

In this kind of vacuum belt filter, the belt or cloth is stationary whilst the slurry is being subjected to suction, through the belt or cloth, by the vacuum box arrangement, and the belt or cloth is stepped forward whilst the suction is switched off. The stepping forward of the belt or cloth may be effected by various means such as an air motor, an electric motor, or a rotating drive arrangement. More recently I have developed an arrangement wherein a pneumatic ram or like mechanism serves to displace a front guide roller for the forward end of the upper run of the belt so as to extend such upper run by drawing a further portion of the belt or cloth into its rearward end, this being permitted by a section of the belt or cloth formed into a reserve bight by a weighted roller. In this arrangement, reverse movement of the belt or cloth is prevented by a unidirectional mechanism acting on the belt or cloth in a return run thereof before it reaches the reserve bight.

An advantage of this proposal involving a ram and a unidirectional mechanism (such as a free-wheel roller which is permitted to rotate in one direction only) lies in the fact that no additional drive for the belt or cloth has to be provided over and above the pneumatic ram or like arrangement which extends the forward end of the upper run of the belt or cloth.

A potential disadvantage thereof, however, lies in the fact that the weighted roller does not only impart tension to the belt or cloth and maintain the reserve bight. It has to be heavy enough to be effective, upon reverse movement of the front guide roller, to cause the corresponding forward end portion of the upper run of the belt or cloth to be drawn into the return run, and a corresponding portion of the latter to be drawn into the reserve bight. The weighted roller may, accordingly, have to be very heavy, with the result that it imposes an unnecessarily high tension on the cloth. This can be particularly the case where a scraper or like member is used, upstream of the upper run of the belt or cloth, for removing the filter cake from the cloth, as considerable friction can arise with such a scraper and this friction has to be overcome in moving the belt or cloth. In some instances, the forces involved may be so great that the use of a weighted roller is impracticable.

An object of the present invention is to provide an arrangement whereby these difficulties are overcome, the means for drawing the belt forwards stepwise in its upper run correspondingly positively displacing the belt along at least part of its return run, so that it will do any necessary work in overcoming the friction of a scraper or like mechanism (if provided) for removing filter cake and it largely relieves the weighted roller of the task of displacing the belt, thereby leaving such weighted roller to function principally to impart tension to the belt or cloth and to compensate for any irregularities in the movement of the belt or cloth.

DISCLOSURE OF INVENTION

With this object in view the present invention provides a vacuum belt filter of the kind comprising an endless filter belt or cloth adapted to be progressed so that an upper run thereof moves stepwise over a vacuum box arrangement whereby slurry applied to said upper run will be dewatered to cause a filter cake to be deposited on said upper run, characterised in that the means for progressing the belt or cloth comprises first and second displaceable stepping rolls acting on the belt or cloth downstream of the forward end of the upper run of the belt or cloth, one at each side of a first unidirectional mechanism effective to prevent return movement of the belt or cloth, a second unidirectional mechanism being disposed between the second displaceable stepping roll and a reserve bight formed by a weighted roller, the two displaceable stepping rolls being coupled for the one to extend a respective bight of the belt or cloth whilst the other is reduced, and vice versa.

The arrangement of the invention has the advantage that the first and second rolls serve to extend and relax respective bights in unison and complementarily to one another, thereby positively to draw successive portions of the upper run of the belt into the return run, with the result that the weighted roller is largely relieved of the task of causing stepping of the belt or cloth and serves primarily to tension the belt or cloth.

In order that the invention may be fully understood, it will be described further, by way of example, with reference to the accompanying drawings, in which:

BRIEF DESCRIPTION OF DRAWINGS

FIG. 1 is a diagrammatic side elevation illustrating a practical embodiment of a horizontal vacuum belt filter according to one of my prior proposals;

FIG. 3 is a section along the line III—III of FIG. 2A in the direction indicated;

FIG. 4 is a fragmentary view, to an enlarged scale, illustrating one of the rollers which incorporates a unidirectional arrangement in the same practical embodiment of the invention; and FIG. 5 is a fragmentary side elevation corresponding to FIG. 2A, but to a smaller scale and illustrating a modification.

Figure 2A:
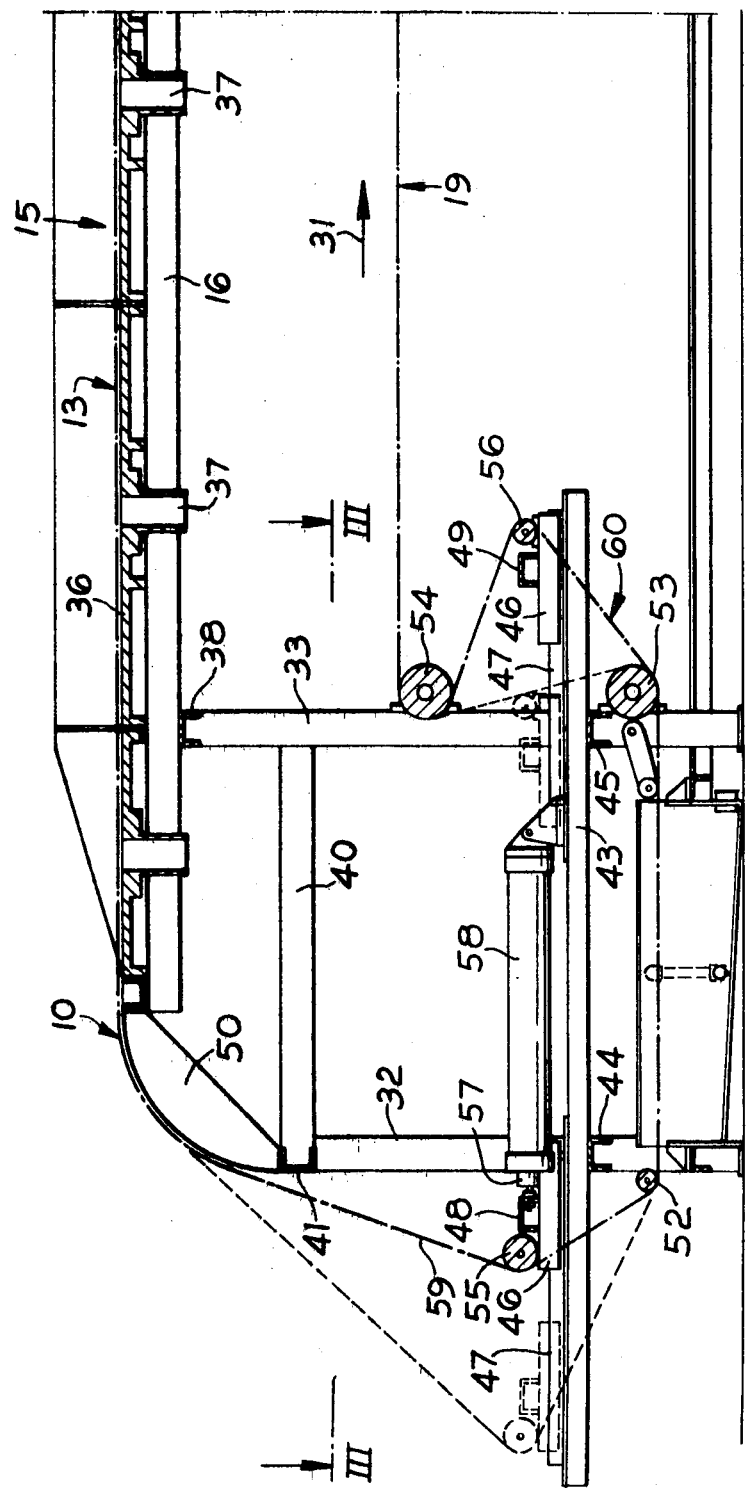
FIG. 2A is a fragmentary cross-section illustrating a forward end of a practical embodiment of the vacuum belt filter comforming to the present invention.

Referring firstly to FIG. 1, this figure illustrates diagrammatically a practical embodiment of a horizontal vacuum belt filter according to one of my previous proposals. The filter comprises an endless filter belt or cloth indicated generally by the reference numeral 10. A rear guide roller 11 and a forward guide roller 12 guide a part of the belt or cloth 10 in an upper run 13 which extends over a slurry supply station indicated generally at 14 followed by a vacuum section 15 in which it extends over one or more vacuum boxes of which one only is illustrated at 16. The forward guide roller 12 is displaceably carried by an extensible rod 17 of a pneumatic ram 18.

The rest of the belt or cloth 10 is a return run 19 thereof and this is guided, by successive rollers 20, 21, 22, 23, 24 and 25, back to the rear guide roller 11. A reserve bight 26 is formed in the return run 19, so as to hang down between the rollers 24 and 25, and located in this bight 26 is a weighted roller 27 capable of up and down movement as indicated by the double arrow 28. A slurry supply pipe 30 serves to supply slurry onto the upper surface of the belt or cloth 10 in the region of the supply station 14.

The one or the other of the guide rolls 21 or 22 embodies a freewheel or ratchet mechanism (not visible), which restricts the movement of the return run of the belt or cloth 10 to the direction indicated by the arrow 31.

The operation of this prior filter construction is, briefly, as follows. Flurry (not shown) to be dewatered is supplied onto the upper surface of the belt or cloth 10 in the supply station 14 by the supply pipe 30 and is appropriately spread across the belt or cloth 10.

The ram 18 is illustrated as being extended. A vacuum is applied to the vacuum section 15 of the belt or cloth 10 by the vacuum box 16 for dewatering any slurry thereon. Upon retraction of the ram 18, the roller 12 is moved to the right (considered as in the drawing), with the result that the forward end of the upper run 13 of the belt or cloth 10 is drawn into the lower run 19. This is achieved by the weighted roller 27, the vacuum acting on the belt or cloth 10 in the vacuum section 15 serving to ensure that there is no return movement of the upper run 13. This vacuum also serves, of course, to dewater the slurry carried on the upper surface of the upper run 13 of the belt or cloth 10.

For stepping the belt or cloth 10 forward, the vacuum is relaxed, and the ram 18 is actuated to extend the rod 17 so as to bring the forward guide roller 12 back to the illustrated position. This of course, results in the upper run 13 of the belt or cloth being shifted to the left (as viewed in the drawing) and drawing into itself a portion of the return run of the belt or cloth, by reducing the extent of the reserve bight 26. The belt or cloth is prevented from drawing back from the return run, at the forward guide roller end, by the unidirectional arrangement of the roller 21 or 22.

In this arrangement, the weighted roller 27 has to be sufficiently heavy to displace the entire weight of the belt, in the lower or return run, between the forward guide roller 12 and the guide roller 24, and if a scraper (not shown) is provided to engage the belt or cloth at or near the forward guide roller 12 for removing filter cake, the friction of this scraper has to be overcome also.

DETAILED DESCRIPTION OF INVENTION

Turning now to FIGS. 2A, 2B 3 and 4, these figures illustrate a first practical embodiment of the filter of the invention. It embodies many components corresponding to those already described with reference to FIG. 1, but now shown in greater detail in relation to a supporting framework. For the sake of clarity these components have been allocated similar reference numerals and are not described in great detail.

Numerous guide rollers and an endless filter belt or cloth 10 are mounted on the supporting framework which basically comprises four parallel spaced-apart pairs 32, 33, 34, 35 of U-section uprights. The uprights 33 and 34 are of substantially equal height and a belt-supporting and guiding platform 36 extends thereacross. A number of equally spaced apertures 37 are provided in the platform 36. Upper U-section members 38, 39 respectively extend horizontally, and transversely of the belt 10, between respective uprights of the pairs 33 and 34. A number of longitudinal vacuum boxes 16 are mounted beneath the platform 36 and extend between the aforesaid members 38, 39.

The uprights 32 at the front of the filter are shorter than the uprights 33 and 34 and the upper ends of said uprights 32 are connected to the uprights 33 by a pair of horizontal members 40 extending in the longitudinal direction of the belt 10. The upper ends of the uprights 32 are also connected together by a transverse horizontal member 41.

The rear uprights 35 are both slotted throughout their respective lengths as indicated at 42.

In contrast to the embodiment of FIG. 1, this filter does not incorporate a displaceable forward guide roller, but, instead has a stationary curved guide shoe 50 supported between the transverse member 41 and the front end of the platform 36. A part of the belt 10 is therefore guided in a substantially horizontal upper run 13 over the platform 36 between a rear guide roller 11 and the aforesaid guide shoe 50. During the course of the upper run 13 the belt 10 passes through a feed station 14 where slurry is fed onto the belt 10 from a feed pipe 30 and a vacuum section 15 wherein said slurry is progressively dewatered and deposits a filter cake on the belt 10.

Subsequent to the shoe 50 are guide rollers 52, 53 and 54 which are positioned similarly to the rollers 20, 21 and 22 of FIG. 1. In this embodiment of the invention, however, both the roller 53 and the roller 54 incorporate respective unidirectional arrangements in the form of pawl and ratchet mechanisms which confine the movement of the belt or cloth 10 always to the direction indicated by the arrow 31. FIG. 4 serves to illustrate the pawl and ratchet mechanism on the roller 54, the ratchet wheel 61 being fitted onto one end of the roller 54 and the pawl 62 being pivotally attached to the upright 33 to permit movement of the roller 54 only in the clockwise direction as shown in the drawing. A first displaceable stepping roll 55 is located between the shoe 50 and the guide roller 52. A second displaceable stepping roll 56 is located between the guide rollers 53 and 54. These rolls 55, 56 are displaceable in unison by the action of respective displaceable rods 57 of a pair of stepping rams 58 which are mounted horizontally at respective sides of the belt 10 as shown in FIG. 3. Each ram 58 is fitted onto a horizontal longitudinally-extending member 43, which is, in turn, supported upon lower transverse members 44, 45 extending between respective uprights of upright pairs 32 and 33. The rolls 55 and 56 are each supported between respective pairs of carriage blocks 46, which blocks 46 are each slideable along respective guide rails 47 on the horizontal members 43. Mounted adjacent and parallel to the stepping rolls 55, 56 respectively, and also between respective pairs of carriage blocks 46, are horizontal U-section members 48 and 49 between which is a central longitudinal strut 63. The ends of the displaceable rods 57 are fixed to the members 48 so that simultaneous projection of or retraction of the rods 57, causes, by the aforesaid interconnection of parts, movement of the members 48 and 49, the carriages 46 along the rails 47 and the rolls 55 and 56 for the same distance.

Figure 2B:
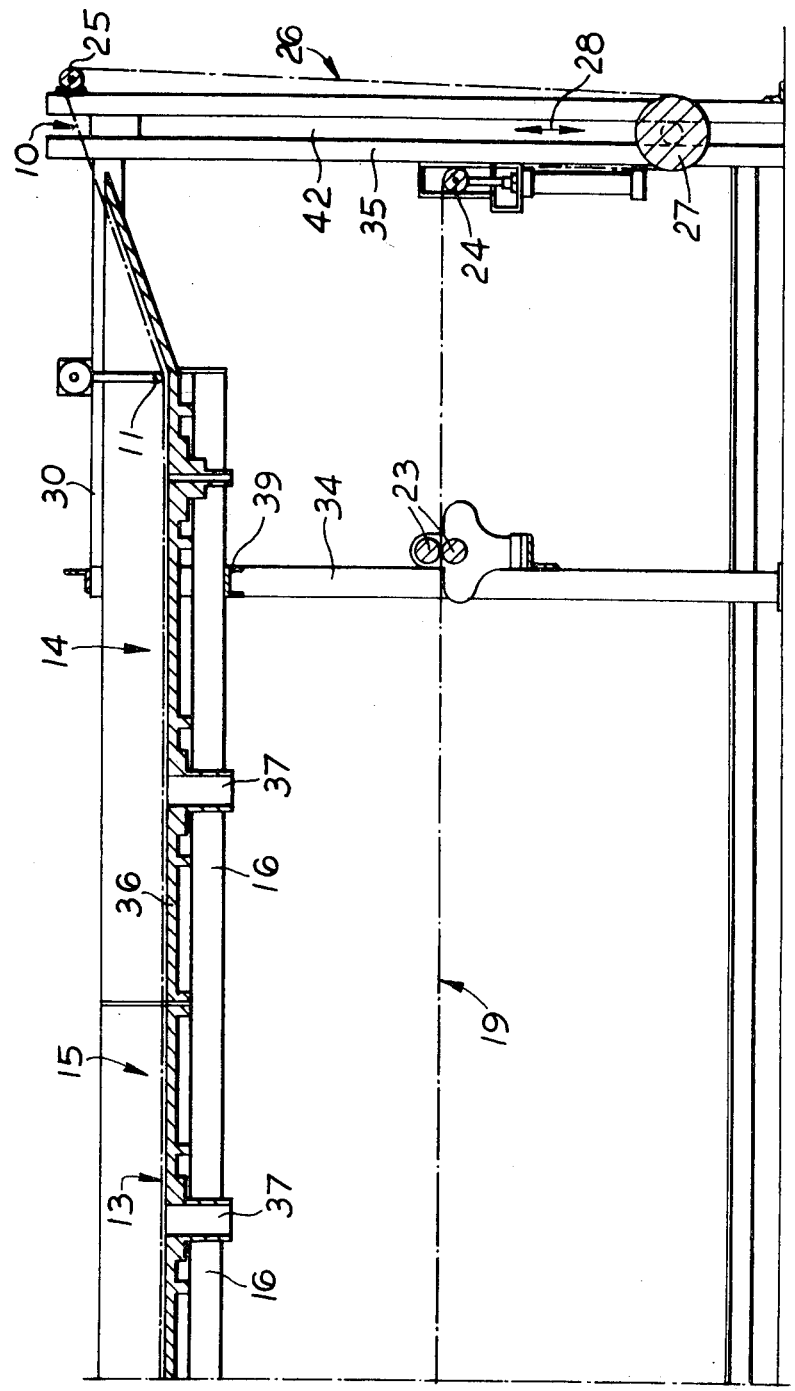
FIG. 2B is a fragmentary cross-section illustrating the rear end of the same practical embodiment of the invention.

A pair of guide rollers 23 which form a transverse nip for the belt 10 are mounted part way up the uprights 34. Further guide rollers 24 and 25 are mounted, as shown in FIG. 2B, adjacent the rear upright 35 in the slot 42 of which a weighted roller 27 is capable of rising and falling, as indicated by arrow 28, in a reserve bight 26 of the belt 10. Thus the rest of the belt 10 is guided in a lower return run 19 from the guide shoe 50 to the rear guide roller 11 via rollers 52, 53, 54, 23, 24, 27 and 25.

Operation of this filter, which is comparable with that of FIG. 1, will be readily understood from the foregoing description. Upon the rams 58 being displaced to the left to bring the first stepping roll 55 to the dotted-line position, bight 59 in the belt or cloth 10, between the shoe 50 and the roller 52 is extended to draw some of the forward end of the upper run 13 of the belt or cloth 10 into such bight 59, movement in the opposite direction of the belt, being prevented by the unidirectional pawl and ratchet mechanisms of the rollers 53 and 54. Simultaneously, the second displaceable stepping roll 56 moves to its dotted line position, complementarily to and in unison with the change in the bight 59, to reduce the extent of its bight 60, thereby permitting part of the return run of the belt or cloth 10 to move back into the upper run at the rearward guide roller 25 without significantly affecting the position of the weighted roller 27.

Subsequently, the rams 58 are displaced to the right to return the stepping rolls 55, to their initial positions, reduce the bight 59 and correspondingly extend the bight 60. This cycle is repeated continuously as long as the filter is in use.

Accordingly, the belt or cloth 10 is progressed stepwide and effectively by the rams 58 without relying entirely upon the weighted roller 27 which serves primarily to maintain the tension of the belt or cloth and to compensate for dimensional discrepancies which may arise in operation of the filter.

FIG. 5 illustrates a modification of the filter of FIGS. 2A, 2B, 3 and 4 in which a large diameter guide roller 70 is employed in the place of the guide shoe 50.

In a further embodiment of the vacuum belt filter of the present invention, a scraper, for example a piano wire scraper, may be located closely adjacent the guide shoe or large diameter guide roller and serve to scrape from the belt or cloth the filter cake carried thereon. The above-described mechanism for stepwise movement of the belt is quite sufficient to overcome the considerable friction drag which may result from impingement of such a scraper against the belt.

As a unidirectional arrangement on the guide rollers located at respective sides of the second displaceable stepping roll, a free wheel mechanism may be employed in place of a pawl and ratchet mechanism. Other variations are, of course, possible.

I claim:

1. A vacuum belt filter apparatus comprising: means for precluding the requirement of heavy tensioning rollers including, an endless filter belt, guide means guiding the filter belt in a substantially horizontal upper run and in a looped lower return run, drive means for moving the belt intermittently outboard toward a forward end in the upper run and inboard away from the forward end in the return run and including first and second displaceable stepping rolls engaging the belt at respective sides of the loop in the return run and being coupled for the alternating arrangement of one extending a respective bight in the belt while the other is reducing a respective bight, a first unidirectional mechanism located in the loop between the first and second displaceable stepping rolls, a second unidirectional mechanism engaging the lower return run downstream of the second displaceable stepping roll, the first and second unidirectional mechanisms being effective in preventing return movement of the belt, a feeding station for feeding slurry onto the belt upper run, vacuum chamber means positioned below the upper run and operative to exert a vacuum and thereby suck away liquid from the slurry for leaving a filter cake on the belt.

2. In the vacuum belt filter as set forth in claim 1 including, a stepping ram operative for displacing the first and second stepping rolls.

3. In the vacuum belt filter as set forth in claim 1, the first and second unidirectional mechanisms including rollers having pawl and ratchet arrangements.

4. In the vacuum belt filter as set forth in claim 1, including, a scraper for impinging against the belt adjacent the forward end and removing the filter cake deposited on the belt.

5. In the vacuum belt filter as set forth in claim 1 including, a stationary guide shoe at the belt forward end for guiding the belt from the upper run to the lower run.

6. A vacuum belt filter as set forth in claim 1 including, a weighted roller located in a further bight of the lower return run of the belt downstream of the second unidirectional mechanism for maintaining the belt under tension.

7. A vacuum belt filter comprising: means for precluding the requirement of heavy tensioning rollers including, a framework of a plurality of pairs of uprights supporting a substantially horizontal platform and a plurality of guide rollers, an endless filter belt supported by the framework and guided over the platform in an upper run and around the guide rollers in a looped lower return run, drive means for moving the belt intermittently in a forward direction and including a pair of rails mounted between adjacent uprights at respective sides of the loop, two pairs of interconnected carriages slidable along the rails, first and second displaceable stepping rolls mounted transversely of the belt lower run between respective pairs of the carriages to engage respective sides of the loop, a first unidirectional mechanism located in the loop between the first and second displaceable stepping rolls, a second unidirectional mechanism engaging the return run downstream of the second displaceable stepping roll, the first and second unidirectional mechanisms each including rollers having a pawl and ratchet arrangement and being effective to prevent reverse movement of the belt, a stepping ram operative to move the interconnected carriage pairs and thereby the first and second stepping rolls in unison to extend a respective bight of the belt while the other is reduced, and vice versa, a feeding station for feeding slurry onto the upper run, and vacuum chamber means positioned below the upper run and operative to exert a vacuum and thereby suck away liquid from the slurry to leave a filter cake deposited on the belt.

* * * * *